United States Patent
Colley et al.

[11] Patent Number: 6,152,372
[45] Date of Patent: Nov. 28, 2000

[54] DITHERING ASSEMBLIES FOR BARCODE SCANNERS

[75] Inventors: James E. Colley, Junction City; James W. Ring, Blodgett; Patrick M. O'Donnell, Springfield, all of Oreg.; Thomas C. Arends, Bellevue, Wash.

[73] Assignee: PSC Scanning, Inc., Eugene, Oreg.

[21] Appl. No.: 08/934,487

[22] Filed: Sep. 19, 1997

Related U.S. Application Data

[60] Provisional application No. 60/027,487, Sep. 26, 1996, and provisional application No. 60/026,536, Sep. 23, 1996.

[51] Int. Cl.⁷ ........................................................ G06K 7/10
[52] U.S. Cl. .................... 235/472.01; 235/462.45
[58] Field of Search ........................... 235/472.01, 462.45

[56] References Cited

U.S. PATENT DOCUMENTS

| | | | |
|---|---|---|---|
| 4,978,860 | 12/1990 | Bayley et al. ........................ | 250/568 |
| 5,214,270 | 5/1993 | Rando . | |
| 5,329,103 | 7/1994 | Rando . | |
| 5,475,206 | 12/1995 | Reddersen et al. . | |
| 5,530,233 | 6/1996 | Krichever et al. ...................... | 235/440 |
| 5,543,609 | 8/1996 | Giordano et al. . | |
| 5,565,668 | 10/1996 | Reddersen et al. . | |
| 5,614,706 | 3/1997 | Bard et al. . | |
| 5,641,958 | 6/1997 | Rudeen ................................... | 250/235 |
| 5,661,290 | 8/1997 | Bard et al. . | |

*Primary Examiner*—Harold I. Pitts
*Attorney, Agent, or Firm*—Lyon & Lyon LLP

[57] ABSTRACT

A compact scan module including a resonantly driven dithering assembly employing feedback and/or travel stops for scanning an illumination beam of a barcode scanner. In one construction the dithering assembly includes one or more travel stops to limit the motion of the mirror assembly with the two travel stop(s) fabricated from damped resilient material to absorb excess energy imparted on the dithering assembly. A first preferred feedback embodiment employs a Hall effect sensor wherein a feedback magnet is connected to the dithering assembly with a Hall effect sensor positioned to sense the varying magnetic field resulting from the varying position of the feedback magnet. A second feedback embodiment incorporates piezoelectric feedback wherein one or more piezoelectric strain sensors are attached to the bending member to provide the position sensing.

10 Claims, 13 Drawing Sheets

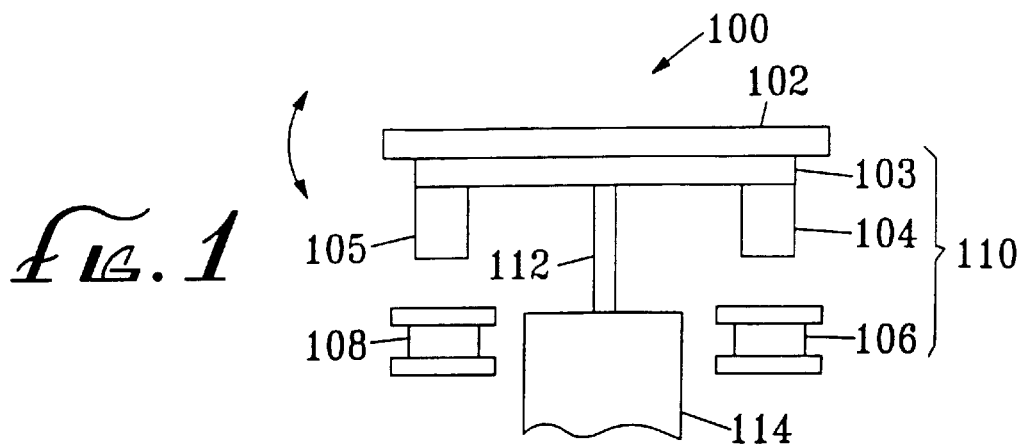
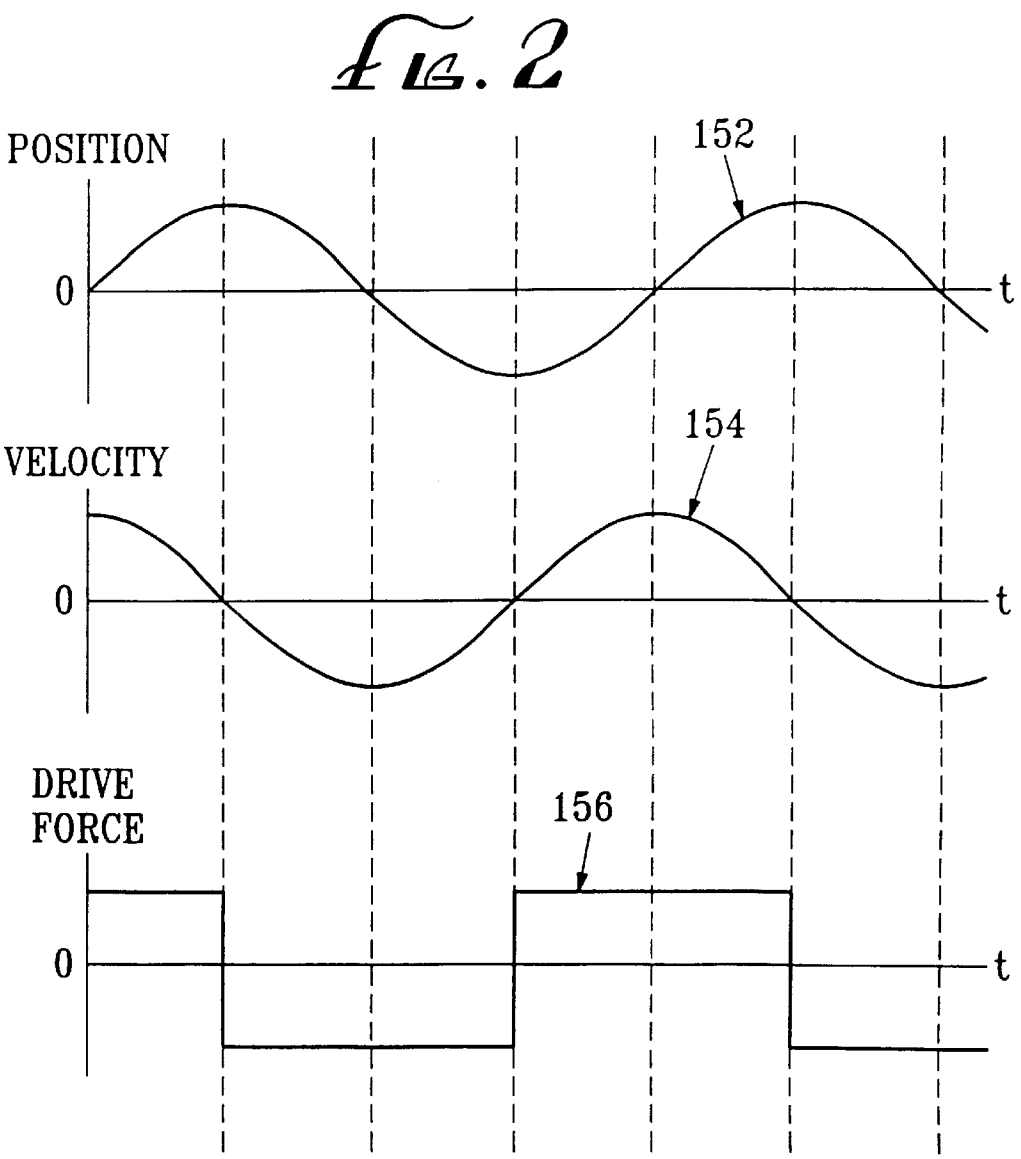

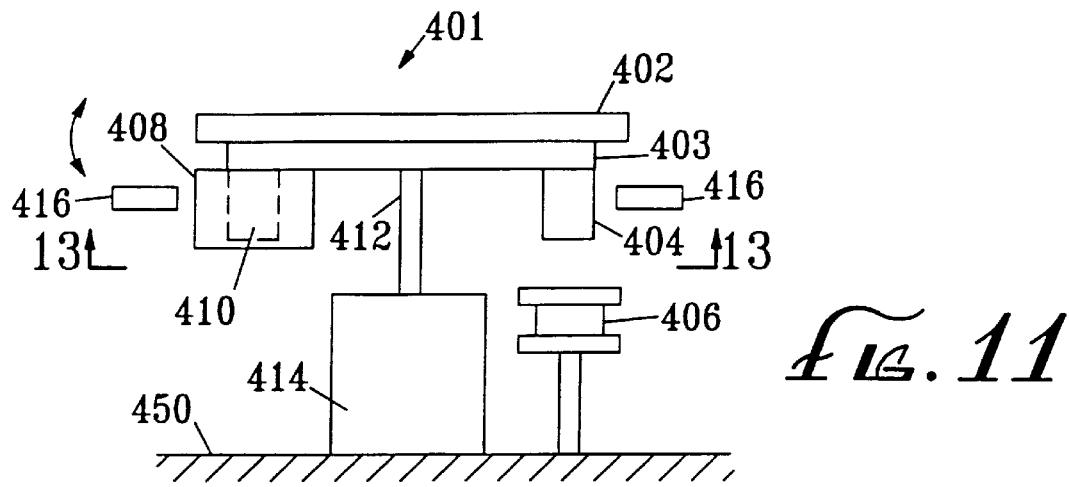
*fig.* 11
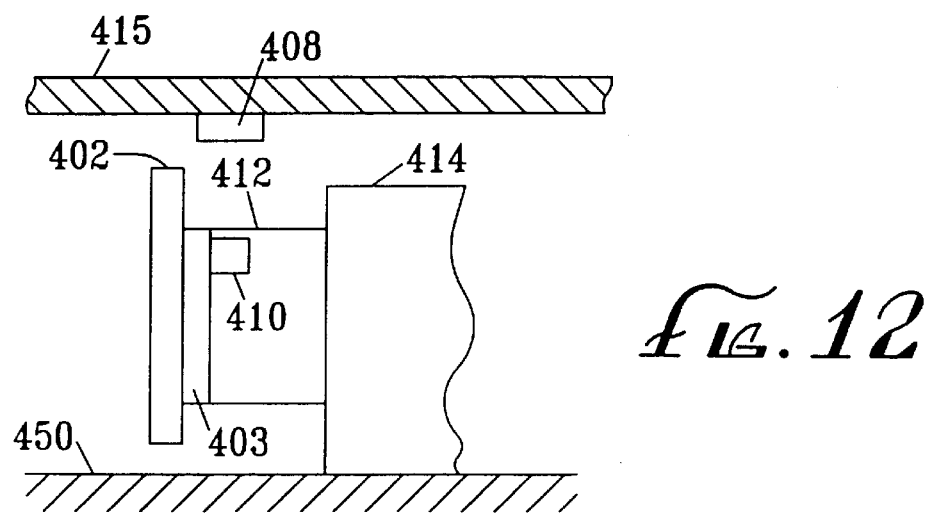
*fig.* 12
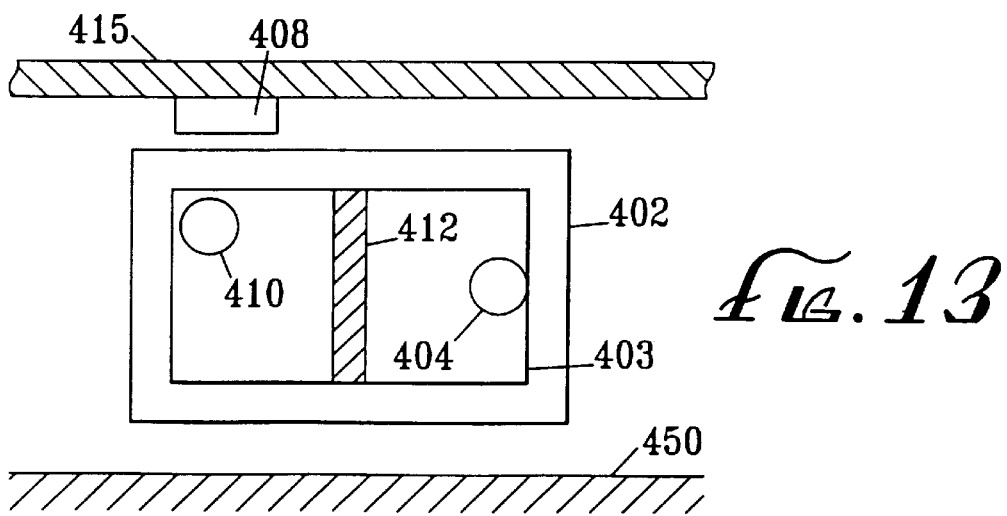
*fig.* 13

DITHERING ASSEMBLIES FOR BARCODE SCANNERS

This application is a continuing application of provisional application Ser. No. 60/027,487 filed Sep. 26, 1996 and provisional application Ser. No. 60/026,536 filed Sep. 23, 1996.

FIELD OF THE INVENTION

The field of the present invention relates to dithering assemblies or more particularly, a resonantly driven dithering mirror assembly employing feedback and employing travel stops for scanning an illumination beam for a barcode scanner.

BACKGROUND

In applications requiring rapid scanning of an illumination beam, such as barcode scanning, one method commonly employed for rapidly and repetitively scanning the illumination beam across a scanned region is mirror dithering. Dithering, i.e. rapid rotational oscillation of an illumination beam steering mirror about an axis substantially parallel to the mirror face, causes the illumination beam to move rapidly back and forth generating a scan line. When this scan line illuminates a barcode, the resulting time dependent signal due to detected light scattered and/or reflected from the bars and spaces of the barcode is decoded to extract the information encoded therein. To be used in such scanning applications, the dithering motor generating the mirror motion must be stable and typically employs some sort of feedback between the motor and the motion of the mirror. Particularly for handheld scanning applications, the dithering assembly should be light, compact, reliable, and consume minimum power while producing sufficiently large amplitude motion for scanning. Scanners are typically constructed with a feedback control circuit to actively adjust the length of the scan line so as to remain substantially constant.

Previous dithering assemblies have typically comprised a pair of magnets and a pair of magnetic coils. FIG. 1 illustrates a dithering assembly 100 comprising a mirror/magnet assembly 110, drive coil 106, feedback coil 108, bending member 112, and mounting member 114. The mirror/magnet assembly 110 comprises mirror 102, mirror bracket 103, and drive magnet 104 and feedback magnet 105. The drive coil 106, feedback coil 108 and mounting member 114 may be part of or mounted within a housing (not shown) for dithering assembly 100. The bracket 103 holds mirror 102 and is connected to mounting member 114 by bending member 112, which may comprise a thin, flat sheet of flexible material which acts as a bendable spring. Bending of member 112 results in rotation of mirror/magnet assembly 110 about an axis substantially parallel to mirror 102, perpendicular to the plane of FIG. 1.

It has been generally thought to be advantageous to locate the axis, i.e., the center of rotation (COR), coincident with the center of gravity (COG) of mirror/magnet assembly 110. To protect the ditherer in the presence of severe mechanical shock, a means to constrain the motion of the center axis of rotation may be employed which is convenient in that, at this point, there is no lateral motion (i.e., motion in the plane perpendicular to the COR axis). For example, such means may comprise a moving pin, whose axis is the same as the COR axis, rotating in a stationary hole. The pin does not touch the inside of the hole in normal operation, since this touching would dampen the motion of the ditherer and reduce efficiency. Since there is no lateral motion of the pin—it merely rotates about its axis—the required clearance inside the stationary hole need only be sufficient to accommodate process and temperature variations. Under shock, the pin functions to restrain movement of the COR. If the COR and the COG are the same, and movement of that point is constrained, then shock along any rectilinear axis will only translate the pin to the inside of the hole—no rotation will occur. Thus, no additional shock constraint features are necessary. The present inventors have recognized that if the COR and the COG are not coincident, rotational motion need be restrained in the normal dithering direction.

The dithering assembly 100 comprises an oscillating structure which has a resonant frequency determined by the effective spring constant of bending member 112 and the effective mass of the mirror/magnet assembly 110 and any components attached thereto. The motion of mirror/magnet assembly 110 is driven by passing an oscillating drive current through drive coil 106 thereby generating an oscillating magnetic driving force on drive magnet 104. The maximum amplitude of dithering motion of the mirror 102 occurs when the drive current oscillates at the resonant frequency of dithering assembly 100, i.e., when the dithering assembly 100 is driven resonantly. It is important to drive the dithering assembly 100 resonantly to obtain the maximum dithering amplitude with minimum drive power consumption. It is also important that the position and length of the resulting scan line remain constant.

Even when feedback is employed to keep the drive frequency matched to the resonant frequency, there still can be considerable variation in the amplitude and position of the resulting dithering motion. These amplitude variations may result from a variety of manufacturing and operational variables which may be difficult to control, including but not limited to the precise mass of mirror/magnet assembly 110 and any components attached thereto, the precise dimensions and force constant of bending member 112, the temperature, wear of the dithering assembly, and/or the spatial orientation of the moving drive magnet with respect to the drive coil. Since the amplitude of the dithering motion determines the position and length of the scan line produced by the dithering assembly, and since it is important for the position and length of the scan line to be constant for proper operation of the barcode scanner, the amplitude variations of the dithering motion must be minimized. Such amplitude variations may be minimized by using position feedback to control the amplitude of the drive force. However, such feedback necessitates additional sensing and control electronics, and adds to the overall power consumption, cost, and/or complexity of the barcode scanner. Furthermore, optimization of such a feedback system for proper operation may depend on the same variables which cause the amplitude fluctuations in the first place.

FIG. 2 illustrates typical waveforms for position, velocity, and drive force for a resonantly driven dithering assembly. Position waveform 152 and velocity waveform 154 are substantially sinusoidal, with a phase shift of 90 degrees between the position and the velocity. For a dithering assembly driven at its resonant frequency, velocity waveform 154 will be in phase with drive force waveform 156. Drive force waveform 156 is shown as a square wave in FIG. 2, but may also comprise a substantially sinusoidal waveform.

This feedback has been accomplished in previous dithering assemblies by velocity feedback. Feedback coil 108 experiences an oscillating magnetic field due to feedback magnet 105, which is attached to bracket 103. The electrical potential developed across feedback coil 108 varies directly with time derivative of the magnetic flux at feedback coil 108, and hence with the velocity of feedback magnet 105 and dithering mirror 102. The zero crossings of the feedback potential, which occur when the mirror velocity is zero, are used to trigger switching of the polarity of the drive current in drive coil 106, thereby reversing the drive force exerted on drive magnet 104 and mirror 102. In this manner, the switching frequency of the drive force is always locked to the frequency of the dithering motion of dithering assembly 100 and the drive force is in phase with the velocity as required for a resonantly driven system.

There are several weaknesses with the feedback scheme described above. The electrical potentials developed across feedback coil 108 are typically quite small, on the order of a few millivolts. These signals must be amplified for use as a feedback signal, and the resulting feedback signal is quite noisy. There may be significant cross talk between the drive magnetic fields and feedback coil 108 because the drive coil 106 and drive magnet 104 are nearby. Further, since the feedback coil 108 is manufactured by making many turns of very fine gauge wire in order to maximize output voltage, it is therefore difficult to manufacture and thus can be expensive, bulky, relatively delicate, and/or unreliable.

SUMMARY OF THE INVENTION

The present invention is directed to a scan module and dithering assemblies therefore and more particularly to a resonantly driven dithering mirror assemblies employing feedback and/or employing travel stops for scanning an illumination beam of a barcode scanner.

In a first preferred construction the dithering assembly includes one or more travel stops to limit the motion of the mirror assembly. Incorporation of two travel stops limits the motion of the dithering assembly to a maximum dithering amplitude. Driving the dithering assembly with a drive force amplitude large enough to produce a dithering amplitude at least substantially as large as the maximum dithering amplitude (in the absence of any travel stops) ensures that the dithering amplitude is substantially equal to the maximum dithering amplitude allowed by the travel stops. The substantially constant dithering amplitude results in a substantially constant scan line position and length. The travel stops may be fabricated from a damped resilient material in order to more efficiently absorb excess energy imparted on the dithering assembly by application of the drive force during each cycle of the dithering motion. Alternatively, a single travel stop may be employed to limit the dithering motion in only a first direction. If the ditherer mechanism is highly resonant, as is typically the case, the single travel stop may absorb sufficient energy from the dithering assembly such that the dithering amplitude in a second direction is substantially the same as the maximum dithering amplitude allowed by the travel stop in the first direction.

By use of two travel stops, the rotation axis of the dithering motion may be offset from the center of gravity of the components undergoing dithering motion thereby allowing a greater range of configurations of the dithering assembly to be employed.

Though the travel stop designs may be constructed that do not require feedback systems, feedback may advantageously improve performance. A first preferred feedback embodiment, usable with or without travel stops, employs a Hall effect sensor wherein a feedback magnet is connected to the dithering assembly with a Hall effect sensor positioned to sense the varying magnetic field resulting from the varying position of the feedback magnet. The feedback signal varies with the magnetic field amplitude of the feedback magnet, and hence with the position of the dithering assembly. Since the position and velocity of the oscillatory motion are 90 degrees out of phase, the switching of the drive current must be phase shifted by 90 degrees to resonantly drive the dithering assembly. The Hall sensor may comprise one component of an integrated circuit which also includes an amplifier for the feedback signal. Integration of the sensor and amplifier results in significantly larger and relatively less noisy feedback signals, as well as reduced size, reduced cost, and improved reliability. A second feedback embodiment incorporates piezoelectric feedback wherein one or more piezoelectric strain sensors are attached to the bending member. As the dithering assembly oscillates, a feedback voltage is generated by the piezoelectric strain sensors. The feedback voltage varies directly with the amount of bending of the bending member, and hence with the position of the dithering assembly. The drive current switching is phase shifted by 90 degrees to resonantly drive the dithering assembly. The resulting feedback voltages are relatively large and have low noise, and may generally be used directly without further amplification. The use of a piezoelectric strain sensor for position sensing may result in a more compact, more reliable, and more easily manufactured dithering assembly.

BRIEF DESCRIPTION OF THE DRAWINGS

FIG. 1 is a top view of a previous dithering assembly employing a feedback magnet and coil for velocity feedback;

FIG. 2 illustrates waveforms for the position, velocity, and drive current for a resonantly driven dithering assembly;

FIGS. 11, 12 and 13 comprise top, side, and rear partial cross sectional views of a dithering assembly employing a position feedback sensing mechanism (e.g. Hall sensor and feedback magnet) for providing position feedback according to another preferred embodiment of the present invention;

DETAILED DESCRIPTION OF PREFERRED EMBODIMENTS

Preferred embodiments will now be described with reference to the drawings. For clarity of description, any element numeral in one figure will represent the same element if used in any other figure.

Figure 3:
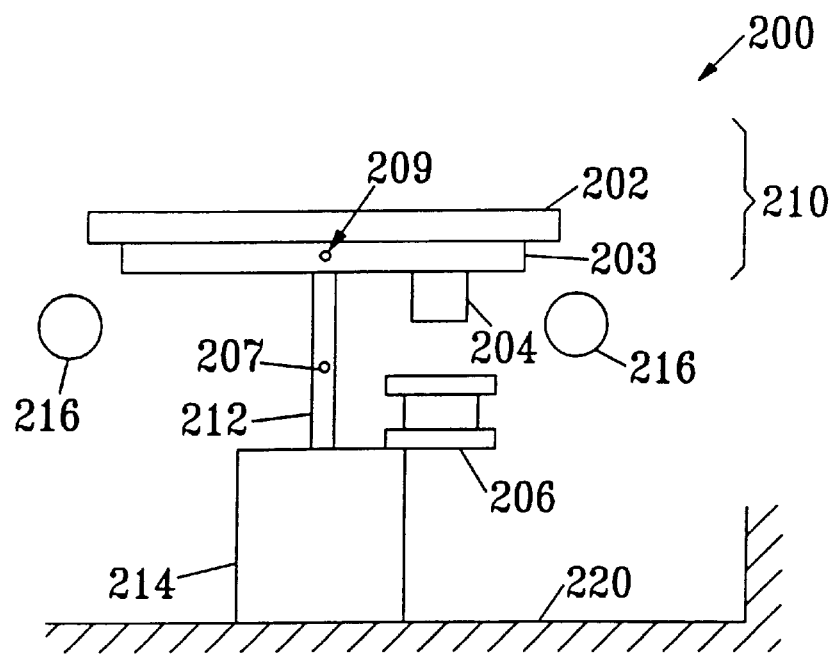
FIG. 3 is a top view of a dithering assembly employing travel stops and an offset rotation axis.

FIG. 3 illustrates a first preferred embodiment of a dithering assembly 200 according to the present invention comprising a mirror/magnet assembly 210, a drive coil or electromagnet 206, a bending member 212, a mounting member 214, and travel stops 216. The mirror/magnet assembly 210 comprises mirror 202 mounted on the mirror bracket 203, and a drive magnet 204 also mounted on the mirror bracket 203. The drive magnet 204 is preferably constructed of rare earth magnetic material such as Neodymium Iron Boron NdFeB or Samarium Cobalt SmCo. The drive coil 206, mounting member 214, and travel stops 216 may be part of or mounted within a housing 220 for the dithering assembly 200. The bracket 203 holds mirror 202 and is connected to mounting member 214 by bending member 212, which may comprise a thin, flat sheet of flexible material which acts as a bendable spring. Suitable materials for bending member 212 include but are not limited to plastic, Mylar™, aluminum, steel, titanium, beryllium copper, or functional equivalents thereof. The bending member 212 acts as a cantilever. Bending of member 212 results in frictionless rotation or pivoting of mirror/magnet assembly 210 about an axis 207 substantially parallel to mirror 202 and perpendicular to the plane of FIG. 3, but which does not necessarily pass through the center of gravity 209 of mirror/magnet assembly 210. The dithering assembly 200 therefore comprises an oscillating structure which has a resonant frequency determined by the effective spring constant of bending member 212, the effective mass of mirror/magnet assembly 210 and any components attached thereto, and the offset between the rotation axis 207 and the center of gravity of mirror/magnet assembly 210. The motion of mirror/magnet assembly 210 is driven by passing an oscillating drive current through drive coil 206, thereby generating an oscillating magnetic driving force on drive magnet 204. The drive current oscillates at the resonant frequency of dithering assembly 200, i.e., dithering assembly 200 is driven resonantly. Position feedback may be employed to keep the drive frequency matched to the resonant frequency such as by means described below.

The travel stops 216 restrict the amplitude of the dithering motion to a maximum dithering amplitude and assist in the reversal of motion of the mirror assembly 210. The travel stops 216 may be part of or mounted within the housing 220. The design amplitude of the drive force is sufficiently large that the resulting dithering amplitude (in the absence of travel stops) would be substantially at least as large as the maximum dithering amplitude allowed by travel stops 216. This design amplitude ensures that the dithering amplitude is substantially the same as the maximum dithering amplitude allowed by travel stops 216 despite variations in manufacturing and operational variables which may be difficult to control, including but not limited to the precise mass of mirror/magnet assembly 210 and any components attached thereto, the precise dimensions and force constant of bending member 212, temperature, wear of dithering assembly 200, and/or the spatial orientation of moving magnet 204 with respect to the drive coil 206 during operation. Since the amplitude of the dithering motion determines the position of the scan line produced by dithering assembly 200, the substantially constant dithering amplitude produced ensures that the position and length of the scan line remains relatively constant.

By use of two travel stops, the rotation axis of the dithering motion may be offset from the center of gravity of the components undergoing dithering motion thereby allowing a greater range of configurations of the dithering assembly to be employed. A mechanical shock along any rectilinear axis which is perpendicular to the COR axis, with the COR constrained, will cause rotation about the COR, but the rotation is limited by the travel stops such that no damage occurs. In order to avoid damage in normal operation, the bending member 212 is designed to accommodate bending to the stops 216 by insuring that the bend radius of the bending member 212, when the ditherer is at the travel stop 216, is substantially greater than the yield radius of the bending member material. Where the travel stops 216 are allowed substantially greater rotation under shock than occurs in normal dithering motion, the risk of shock damage increases substantially if the COR and COG are not coincident.

The travel stops 216 may be fabricated from a damped resilient material in order to more efficiently absorb excess energy imparted on dithering assembly 200 by application of the drive force during each cycle of the dithering motion. If this excess energy is not absorbed by the travel stops, it could be translated into undesirable higher-order harmonic motion of the ditherer. Suitable resilient materials for the travel stops include but are not limited to rubber, plastic, foam tape, Poron™ material (an energy absorbing foam), combinations thereof, and functional equivalents.

Pieces of resilient material may alternatively be attached to mirror/magnet assembly 210 in positions such that the pieces of resilient material are the contact points between mirror/magnet assembly 210 and travel stops 216. In such an embodiment, the travel stops 216 may comprise generally non-resilient elements.

In an alternative embodiment, a single travel stop 216 may be employed to limit the dithering motion in a first direction. The single travel stop 216 absorbs sufficient energy from the dithering assembly that the dithering amplitude in a second direction is substantially the same as the maximum dithering amplitude allowed by the travel stop in the first direction. This absorption is particularly effective for highly resonant dithering mechanisms in which the real image of the mechanism poles is small; in such a case the mechanism is highly resistant to short-term changes in dithering amplitude, making one stop as effective as two for amplitude control.

Figure 4:
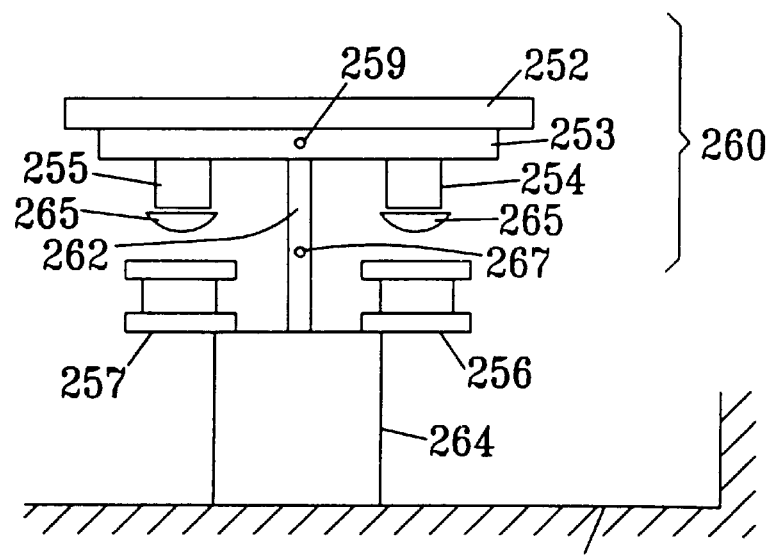
FIG. 4 is a top view of an alternate dithering assembly with multiple coils.

FIG. 4 illustrates an alternate embodiment for a dithering assembly 300 with a mirror/magnet assembly comprising mirror 252 mounted on the mirror bracket 253, and drive magnets 254, 255 also mounted on opposite sides of the mirror bracket 253. Drive coils 256, 257 are mounted on a mounting member 264 and disposed adjacent the drive magnets 254, 255. The drive coils 256, 257 and mounting member 264 may be part of or mounted within a housing 270 for the dithering assembly 250. The bracket 253 holds mirror 252 and is connected to mounting member 264 by bending member 262. The mirror/magnet assembly 260 is driven by passing an oscillating drive current through drive coils 256, 257 thereby generating an oscillating magnetic driving force on the drive magnets 254, 255. Bending of member 262 results in rotation of mirror/magnet assembly 260 about an axis 267 substantially parallel to mirror 252 and perpendicular to the plane of FIG. 4, but which does not necessarily pass through the center of gravity 259 of mirror/magnet assembly 260. In the dithering assembly 250, the travel stops are incorporated into the drive magnets 254, 255 by the inclusion of pads 265, 265 of resilient material. The resilient material 265, 265 may either be positioned on the drive magnets 254, 255 (as illustrated), on the drive coils 256, 257, or on other elements elsewhere on the housing 270.

The dithering assembly may include one drive coil or multiple drive coils for driving the mirror bracket 253. For example, the dithering assembly 200 of FIG. 3 illustrates a single drive coil 206 for driving the drive magnet 204 by passing an oscillating drive current through drive coil 206 thereby generating an oscillating magnetic driving force on drive magnet 204. The dithering assembly 250 of FIG. 4 includes two drive coils 256, 257 for driving the drive magnets 254, 255 disposed on opposite sides of the mirror bracket 253 with power alternated between the drive coils to cooperatively drive the mirror/magnet assembly 260.

Alternately, the dithering assembly 250 may have a drive coil 256 and drive magnet 254, with the other coil 257 and magnet 255 comprising a feedback pair for generating a velocity or position signal.

These drive systems may be advantageously constructed without employing feedback to resonantly drive the dithering assembly provided that the drive force is sufficiently large to produce the maximum amplitude allowed by the travel stops even under non-resonant conditions. Any suitable oscillating drive system may be employed, either with or without feedback, to drive the dithering assembly. Examples of drive systems include but are not limited to magnetic drive systems, electrostatic drive systems, piezoelectric drive systems, combinations thereof, and the like.

A dithering assembly as described may possess one or more of the following advantages:

producing a scan line with substantially constant position and length;

the amplitude of the dithering motion is substantially constant;

the rotation axis of the dithering motion may be offset from the center of gravity of the dithered components;

the amplitude of the dithering motion is constrained by at least one travel stop;

any excess energy imparted on the dithering assembly is absorbed by at least one travel stop; and/or providing a dithering assembly for a barcode scanner which produces a scan line with substantially constant position and length without adding to the power consumption, cost, or complexity of the barcode scanner.

Some preferred feedback systems will now be described which may be constructed in combination with the above-described designs or separately without travel stops.

Figure 5:
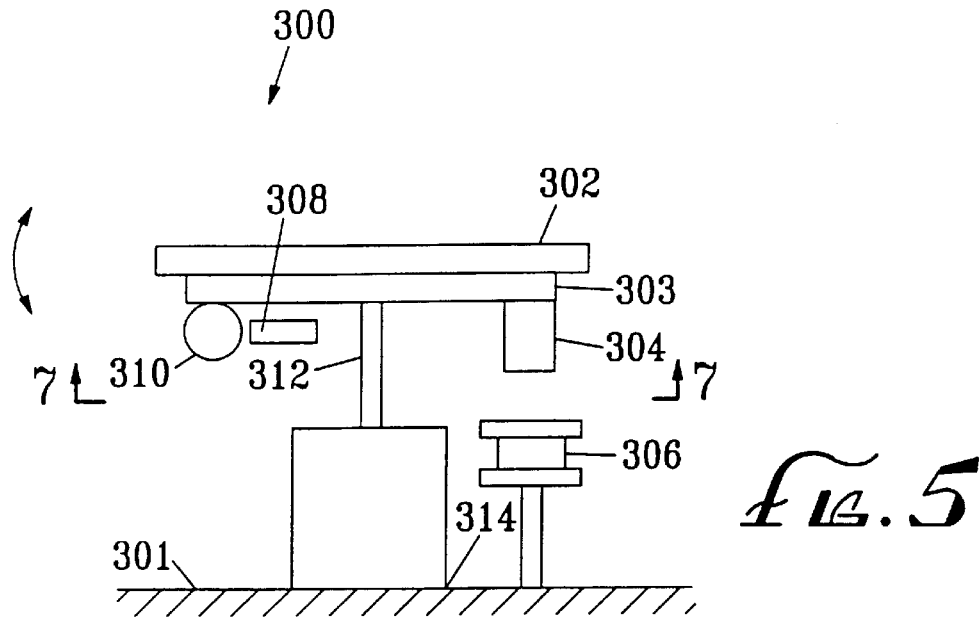
FIGS. 5, 6 and 7 comprise top, side, and rear partial cross sectional views of a dithering assembly employing a position feedback sensing mechanism (e.g. Hall sensor and feedback magnet) for providing position feedback according to another preferred embodiment of the present invention.
Figure 6:
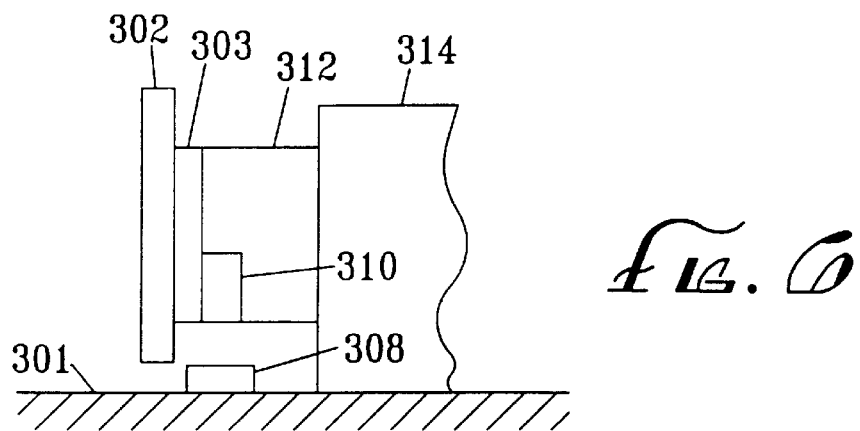
Figure 7:
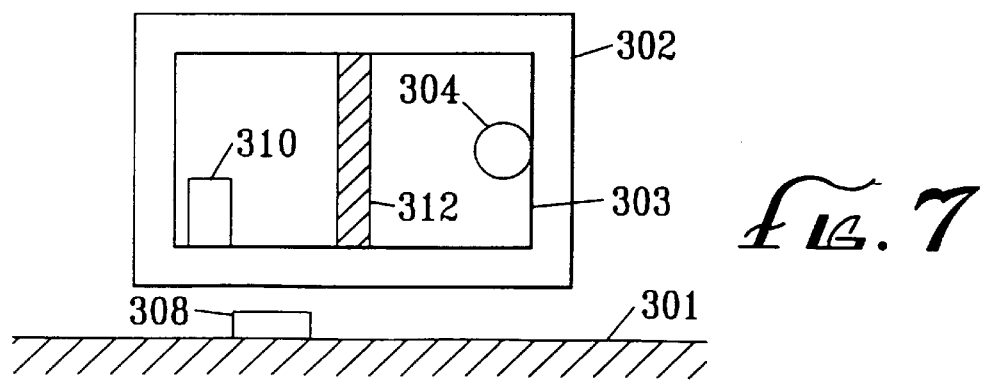

A first preferred embodiment of a dithering assembly employing a position sensor for position feedback is shown in FIGS. 5–7. Dithering assembly 300 comprises mounting member 314 mounted on a base or housing member 301, bending member 312 mounted on the mounting member 314, mirror bracket 303 mounted to the bending member 312, a mirror 302 mounted on the mirror bracket 303, drive magnet 304 also mounted on the mirror bracket 303, drive coil or electro-magnet 306 mounted to the base 301 (as shown or alternately mounted to the mounting bracket 314), a feedback sensor 308 (preferably a Hall effect sensor), and a feedback magnet 310. The drive coil 306, Hall feedback sensor 308, and mounting member 314 may be mounted within or comprise part of the housing member or base 301 of the dithering assembly 300. The bracket 303 holds the mirror 302 and is supported by mounting member 314 via bending member 312. The bending member 312 comprises a spring element (or elements) such as a thin, flat sheet of flexible material which acts as a bendable spring. Suitable materials for bending member 312 include but are not limited to plastic, Mylar™, aluminum, steel, titanium, beryllium copper, combinations thereof, or other functional equivalents.

Flexing of bending member 312 results in oscillation of mirror 302 (over a given arc) about an axis substantially parallel to mirror 302 and perpendicular to the plane of the top view in FIG. 5. The dithering assembly 300 comprises an oscillating structure which has a resonant frequency determined by the effective spring constant of bending member 312 and the effective mass of mirror 302, bracket 303, and any components attached thereto. The motion of mirror 302 is driven by passing an oscillating drive current through drive coil 306, thereby generating an oscillating magnetic driving force on drive magnet 304. The largest amplitude of dithering motion of mirror 302 occurs when the drive current oscillates at the resonant frequency of dithering assembly 300, i.e., when the dithering assembly 300 is driven resonantly.

Figure 8:
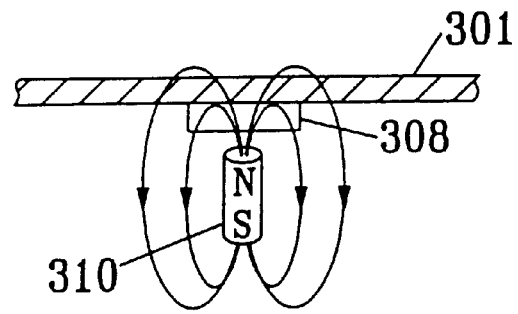
FIGS. 8, 9 and 10 illustrate the relative positions of the feedback magnet, magnetic flux lines, and Hall sensor of the embodiment of FIGS. 5–7.
Figure 9:
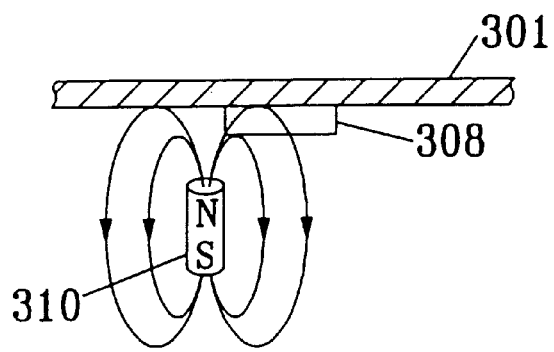
Figure 10:
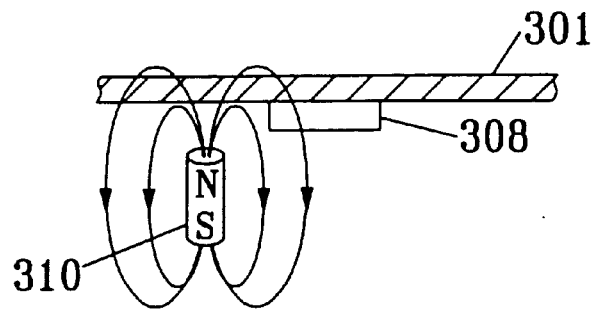

Position feedback is employed to maintain a drive frequency matched to the resonant frequency of the dithering assembly and is provided by feedback magnet 310 and Hall effect feedback sensor 308. The Hall sensor 308 experiences an oscillating magnetic field due to feedback magnet 310, which is attached to bracket 303. The magnetic field amplitudes experienced by Hall sensor 308 for three different positions of feedback magnet 310 are shown in FIGS. 8–10. Magnetic flux lines are shown radiating from the north pole of feedback magnet 310 and returning to the opposite south pole. As the mirror 302 (to which the feedback magnet 310 is attached) is moved through its range of motion, the magnetic field amplitude switches sign as the feedback magnet 310 passes over Hall sensor 308. The electrical potential developed across Hall sensor 308 varies directly with the magnetic flux which is perpendicular to the Hall sensor plane, and hence with the position of feedback magnet 310 and dithering mirror 302. The zero crossings of the Hall sensor potential (minus an offset voltage determined by quiescent bias conditions), which occur when the mirror is located substantially at its center position and the velocity is near maximum, are phase offset by 90 degrees and used to trigger switching of the polarity of the drive current in drive coil 306 (such as by the circuit illustrated in FIG. 20), thereby reversing the drive force exerted on drive magnet 304 and mirror 302. In this manner, the switching frequency of the drive force is always locked to the frequency of the dithering motion of mirror 302 and the drive force is 90 degrees out of phase with the dithering assembly position and in phase with the dithering assembly velocity as required for a resonantly driven dithering assembly.

As illustrated in FIG. 8, the flux lines are substantially perpendicular to the sensitive plane, pointed up and into the sensitive plane of Hall sensor 308, producing a below nominal voltage in the Hall sensor 308. In FIG. 9, the flux lines are parallel to the sensitive plane producing a nominal voltage in the Hall sensor 308. In FIG. 10, the flux lines are perpendicular to the sensitive plane, pointed down, producing an above nominal voltage in the Hall sensor 308.

The Hall sensor 308 preferably comprises an integrated circuit which includes the Hall sensor itself along with an amplifier for amplifying the feedback signal. Integration of the Hall sensor and amplifier may produce a feedback signal voltage of up to a few hundred millivolts with a relatively large signal-to-noise ratio, even with a feedback magnet having a relatively low energy product. The reduced size of Hall sensor 308 allows it to be located farther from drive coil 306 and drive magnet 304, where it is relatively immune to cross-talk from drive coil 306 and/or drive magnet 304. Such a solid state integrated circuit is inherently more reliable than a feedback coil, and may be manufactured and installed in the dithering assembly relatively cheaply and easily.

FIGS. 5–10 illustrate the dithering assembly 300 with the feedback magnet 308 with its magnetic axis oriented vertically relative to the Hall sensor 310 with the motion of the feedback magnet being perpendicular to its axis. FIGS. 11–16 illustrate an alternate dithering assembly 401 having a feedback magnet 408 with its magnetic axis oriented horizontally relative to a Hall sensor 410 with the motion of the feedback magnet being parallel to its axis. The dithering assembly 401 includes a mounting member 414 mounted on a base or housing member 450, bending member 412 mounted on the mounting member 414, mirror bracket 403 mounted to the bending member 412, a mirror 402 mounted on the mirror bracket 403, drive magnet 404 also mounted on the mirror bracket 403, drive coil or electromagnet 406 mounted to the PCB 415, a feedback sensor 408 (such as a Hall effect sensor), and a feedback magnet 410. The bracket 403 holds the mirror 402 and is connected to mounting member 414 by bending member 412. The bending member 412 acts as a cantilever with flexing of member 412 providing for frictionless rotation or pivoting of mirror/magnet assembly 402/403. The bending member 412 comprises a spring element (or elements) such as a thin, flat sheet of flexible material which acts as a bendable spring and operates in similarly fashion as in the previous embodiment.

The motion of mirror 402 is driven by passing an oscillating drive current through drive coil 406, thereby generating an oscillating magnetic driving force on drive magnet 404. The largest amplitude of dithering motion of mirror 402 occurs when the drive current oscillates at the resonant frequency of dithering assembly 401.

Figure 14:
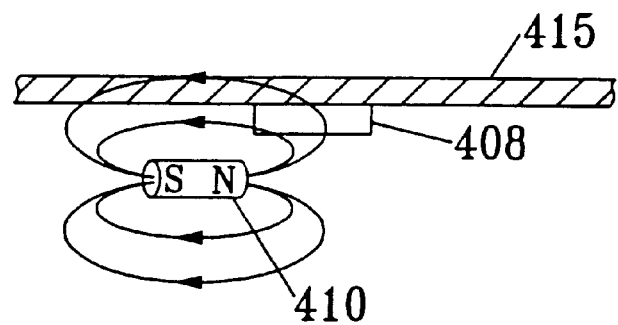
FIGS. 14, 15 and 16 illustrate the relative positions of the feedback magnet, magnetic flux lines, and Hall sensor of the embodiment of FIGS. 11–13.
Figure 15:
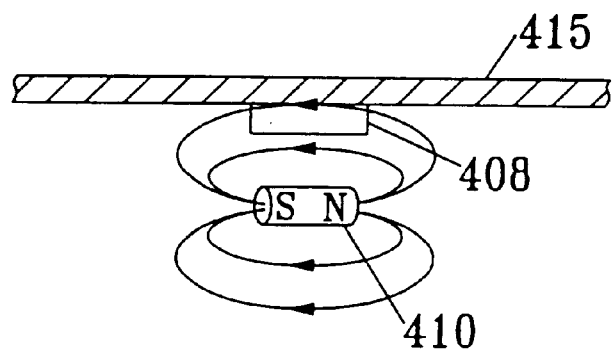
Figure 16:
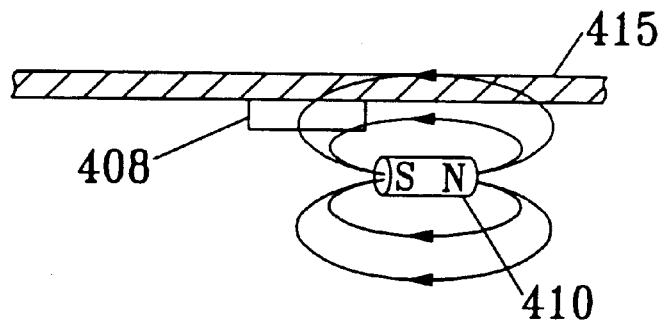

Position feedback is employed to maintain a drive frequency matched to the resonant frequency of the dithering assembly and is provided by feedback magnet 410 and Hall effect feedback sensor 408. The Hall sensor 408 experiences an oscillating magnetic field due to feedback magnet 410, which is attached to bracket 403. The magnetic field amplitudes experienced by Hall sensor 408 for three different positions of feedback magnet 410 are shown in FIGS. 14–16. Magnetic flux lines 416 are shown radiating from the north pole of feedback magnet 410 and returning to the opposite south pole. As the mirror 402 (to which the feedback magnet 410 is attached) is moved through its range of motion, the magnetic field amplitude switches sign as the feedback magnet 410 passes over Hall sensor 408. The electrical potential developed across Hall sensor 408 varies directly with the magnetic field amplitude at Hall sensor 408, and hence with the position of feedback magnet 410 and dithering mirror 402. The zero crossings of the Hall sensor potential (minus an offset voltage determined by quiescent bias conditions), which occur when the mirror is located substantially over the sensor and the velocity is near maximum, are phase shifted by 90 degrees and used to trigger switching of the polarity of the drive current in drive coil 406 (such as by the circuit illustrated in FIG. 20), thereby reversing the drive force exerted on drive magnet 404 and mirror 402. In this manner the switching frequency of the drive force is always locked to the frequency of the dithering motion of mirror 402 and the drive force is 90 degrees out of phase with the dithering assembly position and in phase with the dithering assembly velocity as required for a resonantly driven dithering assembly.

As previously described, the dithering assembly 401 may include travel stop designs of the previous embodiments. For example in FIG. 11, one or more travel stops 416 may be incorporated into the dithering assembly 401.

As illustrated in FIG. 14, the flux lines are substantially perpendicular to the sensitive plane, pointed up and into the sensitive plane of Hall sensor 408, producing a below nominal voltage in the Hall sensor 408. In FIG. 15, the flux lines are substantially parallel to the sensitive plane producing a nominal voltage in the Hall sensor 408. In FIG. 16, the flux lines are substantially perpendicular to the sensitive plane, pointed down, producing an above nominal voltage in the Hall sensor 408. The Hall sensor 408 preferably comprises an integrated circuit as described in the previous embodiment. Thus FIGS. 14–16 illustrate the feedback magnet 408 with its magnetic axis oriented horizontally relative to the Hall sensor 410 with the motion of the feedback magnet being parallel to its axis.

Figure 17:
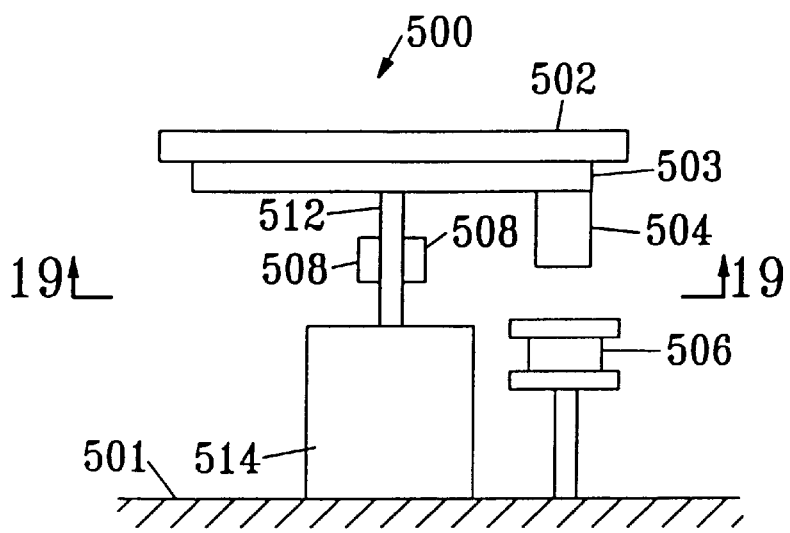
FIGS. 17, 18 and 19 comprise top, side, and rear partial cross sectional views of a dithering assembly employing a piezoelectric strain sensor for position feedback according to another preferred embodiment of the present invention.
Figure 18:
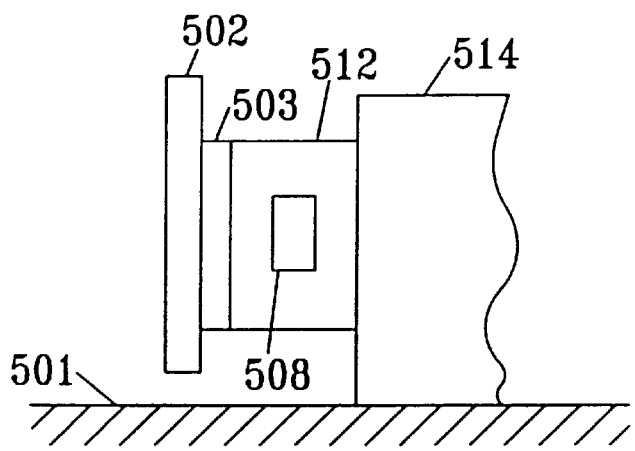
Figure 19:
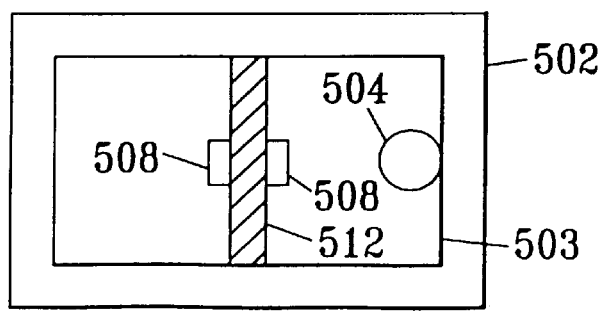

FIGS. 17–19 illustrate an alternate dithering assembly 500 employing an alternate position feedback construction. The dithering assembly 500 comprises a mounting member 514 mounted on a base or housing member 501, a bending member 512 having a first end mounted to the mounting member 514, a mirror bracket 503 mounted on the second end of the bending member 512, a mirror 502 mounted to the mirror bracket 503, a drive magnet 504 also mounted to the mirror bracket 503, a drive coil or electromagnet 506 mounted to the base or housing member 501 (or to the mounting bracket 514), and one or more piezoelectric strain sensors 508 mounted on one or both sides of the bending member 512. Alternately, the bending member 512 may itself be fabricated as a piezoelectric bimorph, that is two oppositely-polarized piezoelectric layers laminated together. The drive coil 506 and mounting member 514 may be part of or mounted within the base or housing member 501 of the dithering assembly 500. The bracket 503 is attached to and supports the mirror 502 and is connected to the mounting member 514 by the bending member 512. The bending member 512 may comprise a thin, flat sheet of flexible material which acts as a bendable spring. Suitable materials for bending member 512 include but are not limited to plastic, Mylar™, aluminum, steel, titanium, beryllium copper, combinations thereof, or functional equivalents. Flexing of the bending member 512 results in rotation of mirror 502 about an axis substantially parallel to mirror 502 and perpendicular to the plane of the top view in FIG. 17.

Thus the dithering assembly 500 comprises an oscillating structure which has a resonant frequency determined by the effective spring constant of bending member 512 and the effective mass of mirror 502, bracket 503, and any components attached thereto. The motion of mirror 502 is driven by passing an oscillating drive current through drive coil 506, thereby generating an oscillating magnetic driving force on drive magnet 504. The largest amplitude of dithering motion of mirror 502 occurs when the drive current oscillates at the resonant frequency of dithering assembly 500, i.e., when the dithering assembly 500 is driven resonantly.

Position feedback is employed to maintain a drive frequency matched to the resonance frequency of the dithering assembly and is provided by a piezoelectric strain sensor 508 mounted on the surface of bending member 512. In a preferred construction, the strain sensor 508 comprises a layer of piezoelectric material deposited on the surface of bending member 512 and a pair of electrodes for measuring the voltage developed across the piezoelectric material. Suitable piezoelectric materials for strain sensor 508 include any piezoelectric material known by one skilled in the art such as polyvinylidene (PVDF) polymer film available from Amp Sensors Inc., Valley Forge, Pa. USA. The electrical potential developed between the electrodes varies directly with the amount of bending of bending member 512, and hence with the position of dithering mirror 502. The zero crossings of the strain sensor potential, which occur when the mirror is located at the zero position and the velocity is near maximum, are phase shifted by 90 degrees and used to trigger switching of the polarity of the drive current in drive coil 506 (by the second circuit illustrated in FIG. 22), thereby reversing the drive force exerted on drive magnet 504 and mirror 502. In this manner the switching frequency of the drive force is always locked to the frequency of the dithering motion of mirror 502 and the drive force is 90 degrees out of phase with the dithering assembly position and in phase with the dithering assembly velocity as required for a resonantly driven dithering assembly. The piezoelectric strain sensor of this construction may be more reliable than a feedback coil, and may be manufactured and installed in the dithering assembly relatively cheaply and easily.

Figure 22:
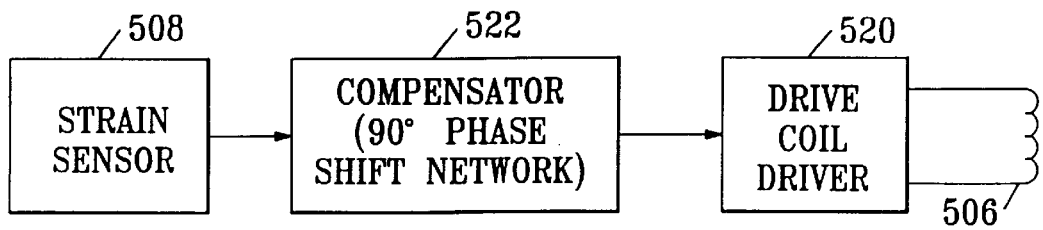
FIG. 22 is simplified block control circuit diagram for the dithering assembly of FIGS. 17–19.

FIG. 22 is an example of a simplified block diagram of a control circuit for the dithering assembly of FIGS. 17–19. The strain sensor 508 provides a signal corresponding to the position of the mirror 502. The signal from the strain sensor 508 is sent to compensator 522 which generates a drive signal used to trigger switching of the polarity of the drive current in drive coil 506 for reversing the drive force exerted on drive magnet 504.

The strain sensor 508 may be mounted to the surface of the bending member 512 or alternately may be mounted within or integrally incorporated into the bending member 512 itself. One example of such a construction, the bending member 512 may comprise a piezoelectric bimorph. In such an example, the bending member 512 itself would function as the strain sensor 508.

Figure 20:
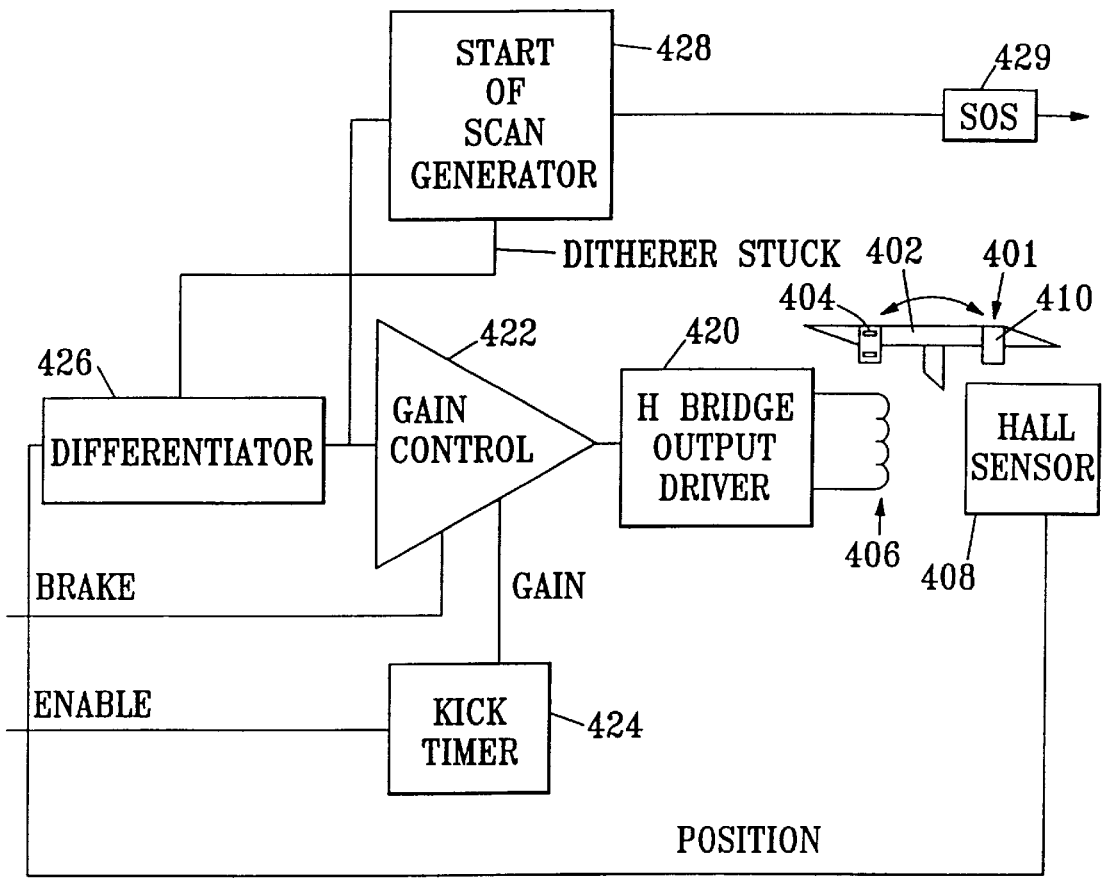
FIG. 20 is block control circuit diagram for the dithering assembly of FIGS. 11–16.
Figure 21:
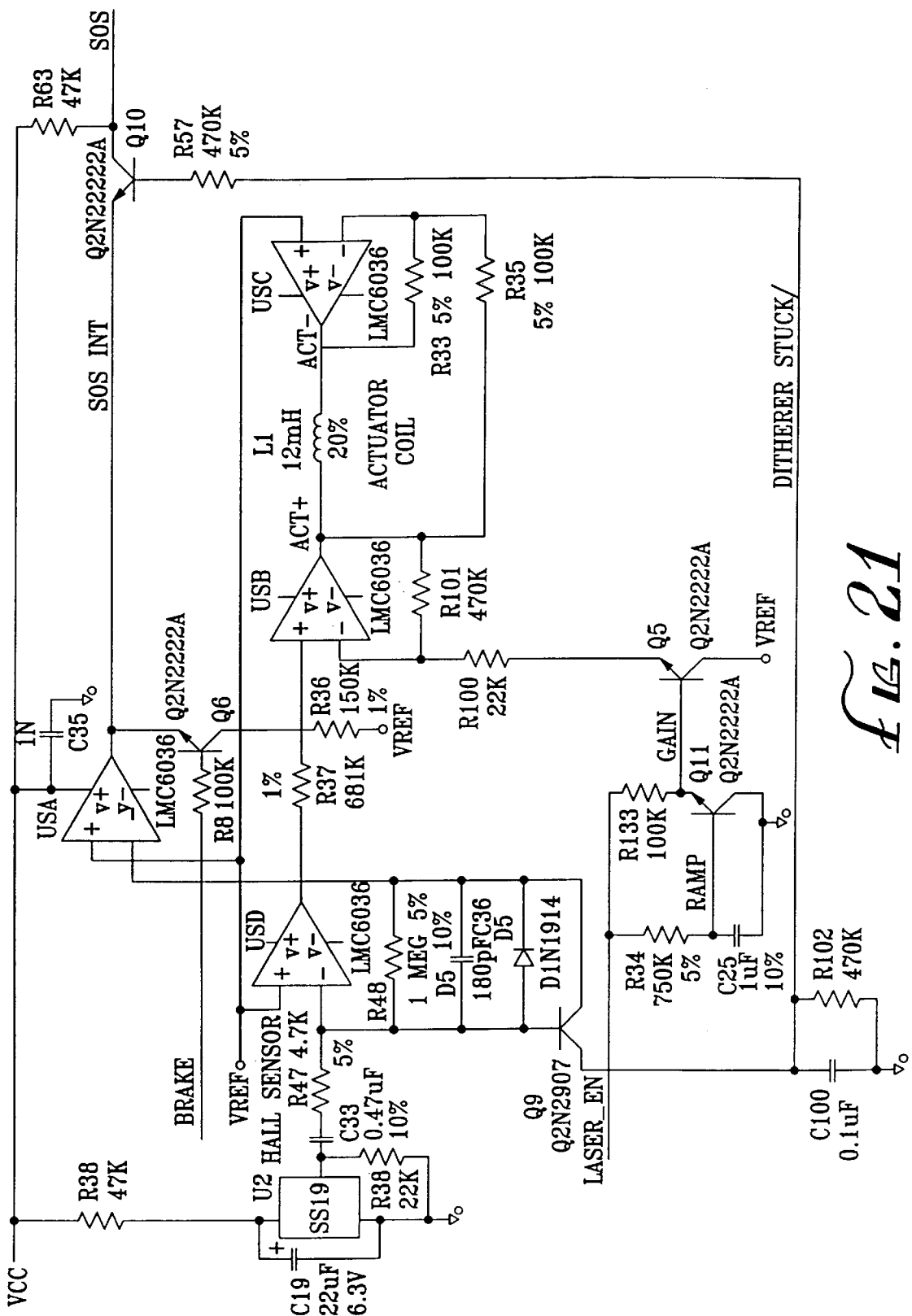
FIG. 21 is a detailed circuit diagram for the dithering assembly of FIGS. 11–16.

A preferred control circuit for the dithering assemblies is described in detail in the block control circuit diagram of FIG. 20 and the detailed circuit diagram of the dither driver of FIG. 21. The schematic references of FIG. 21 are given in parenthesis; most of the components referenced in FIG. 21 are shown in the PCB layout drawings of FIGS. 26–27. The circuits are particularly described with reference to the dithering assembly 401 of FIGS. 11–16 but may be applied to other assemblies.

The H-Bridge Output Driver 420 (U8B, U8C and associated components) provides drive for dithering coil 406. H-bridge configuration may be chosen to provide maximum p—p drive for given supply voltage.

Hall Sensor 408 (U2) provides an electrical signal which indicates the approximate position of the adjacent feedback magnet 410, which is mounted on the back of the dithering mirror 402.

Differentiator 426 (U8D, R48, C33): When the dithering assembly 401 is driven exactly at its resonant frequency, the position waveform will lag the drive waveform by 90°. In a negative feedback loop, oscillation occurs when the total loop phase is 180° and the loop gain is equal to or greater than unity. The differentiator 426 serves to provide the additional 90° of phase shift (independent of frequency), as well as sufficient gain, to insure that these two conditions for oscillation are met. The differentiator 426 also provides a digital signal which is asserted if the POSITION amplitude drops below a threshold, indicating that the ditherer motion is impeded (DITHERER_STUCK—Q9, C100, R102). The differentiator output is limited (by D5 and the base-emitter junction of Q9) to stabilize the actuator coil drive in the presence of supply voltage variation.

Gain Control block 422 (Q5, R100, R101) has two gain levels selected by the GAIN signal. The high gain setting provides a high drive level to the actuator coil immediately following the assertion of ENABLE, for a duration set by the Kick Timer 424, to reduce the ditherer start time. This level is necessary, since without this "kick" the start time is inversely proportional to the real image of the structure poles—which in the case of a highly resonant structure are very close to the imaginary axis. The second, low gain, setting sets the drive level after the Kick Timer 424 has expired. The Gain Control block 422 also includes the capability of reversing the feedback polarity, under the control of the BRAKE signal. When BRAKE is false, the feedback is positive, the loop acts as an oscillator and the mirror dithers. When BRAKE is true, the feedback is negative, and the loop drives the mirror to the rest position.

The Kick Timer 424 (Q11, R34, C25) sets the duration of the high-gain "kick".

Start-Of Scan (SOS) Generator (U8A): The output voltage of the differentiator 426 is equal to reference voltage Vref when the ditherer reaches either end of its travel. Vref is a DC reference voltage whose voltage is approximately Vcc/2. The Start of Scan (SOS) generator 428 compares this output voltage with Vref to create the SOS signal 429, a TTL signal whose level indicates the direction of ditherer travel. Changes of the state of SOS signal 429 occur at the ends of travel. If DITHERER_STUCK is true, the SOS signal 429 is held at a high level (by Q10), to indicate the condition to the host controller so that the laser may be disabled.

While preferred embodiments of feedback systems have been described employing a magnet/coil drive system, alternative embodiments may employ any oscillating drive system which may be phase locked to a position feedback signal with an appropriate phase shift to resonantly drive the dithering assembly. Examples of alternative drive systems include but are not limited to electrostatic drive systems and piezoelectric drive systems.

Figure 23:
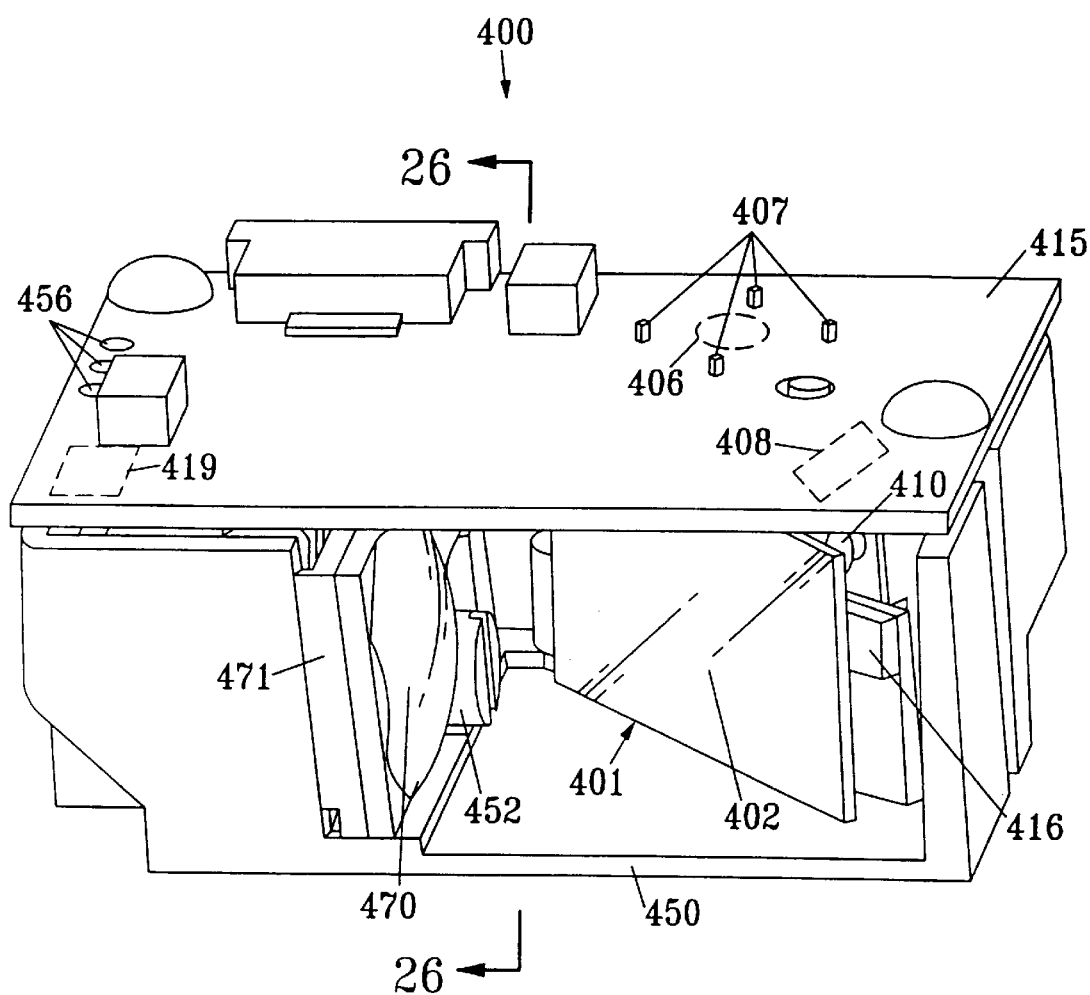
FIG. 23 is a side perspective view of a scan module incorporating the dithering assembly of FIGS. 11–16.
Figure 24:
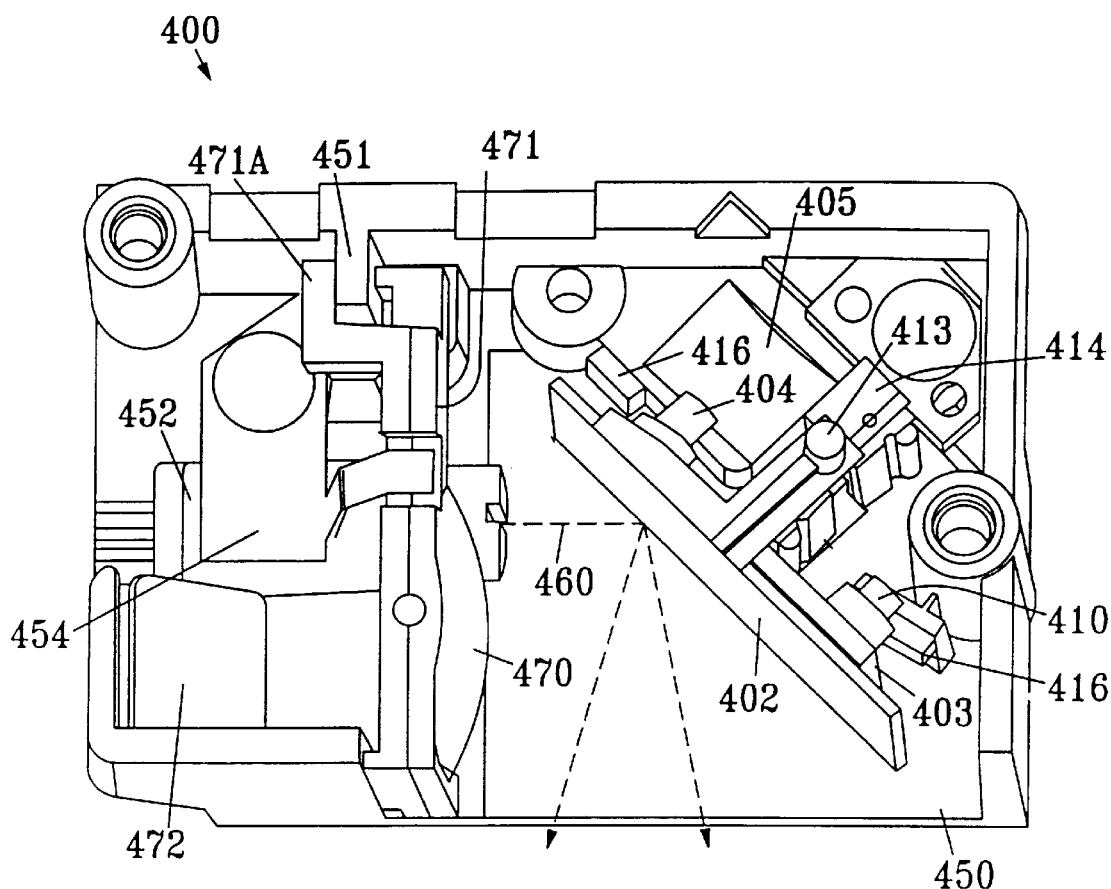
FIG. 24 is a top view of the scan module of FIG. 23 with the printed circuit board removed to reveal internal components.
Figure 25:
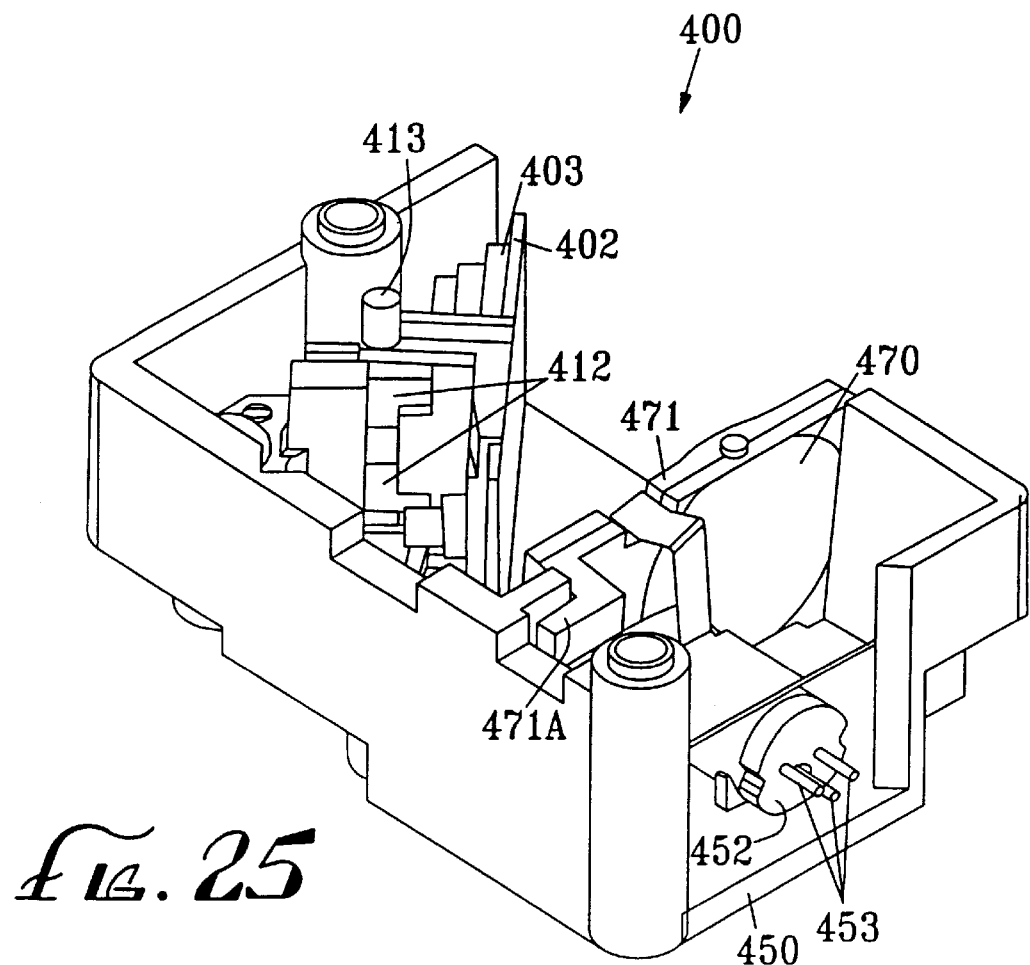
FIG. 25 is rear side perspective view of the scan module of FIG. 23 with the printed circuit board removed to reveal internal components.

The various dithering assemblies described above may provide efficient configurations which may be compactly incorporated into a scan module. FIGS. 23–25 illustrate one such scan module 400 incorporating the dithering assembly 401 of FIGS. 11–13. The scan module 400 includes (1) a main housing 450, (2) the dithering assembly 401, (3) a laser diode module 452 and a collection lens 470 mounted to the housing 450 via clamp 454, (4) a collection fold mirror 472 positioned at 45° behind the collection mirror, and (5) a detector 419 mounted to the underside of PCB 415 over collection fold mirror 472.

The collection lens 470 may be constructed from any suitable lens material such as glass or plastic. The lens 470 is preferably constructed from plastic and integrally molded within its own plastic support bracket 471. The bracket 471 is readily assembled by sliding the bracket 471 into place within the housing 450. The bracket 471 includes a U-shaped end portion 471a which securely attaches to a lip 451 in a side of the housing 450. This one-piece construction integral collection lens 470 and lens bracket 471 assembly reduces the number of module components thereby simplifying module structure and assembly.

The dithering assembly 401 comprises the dithering mirror 402 mounted to mirror bracket 403. A mounting member 414 mounted on a base or housing member 450, bending member or flexure 412 is mounted between the mounting member 414 and the mirror bracket 403. The mounting bracket 403 is pivotally supported on the mounting member 414 via bending member 412. Though they provide no function during normal operation, shock pin(s) 413 are included to constrain motion of the ditherer under high external mechanical conditions (such as when the unit is dropped) to prevent damage to the bending member 412. The drive magnet 404 is also mounted on the mirror bracket 403 with the drive coil 406 mounted to the PCB 415. The feedback sensor 408 (such as a Hall effect sensor) is mounted to the underside of the PCB 415 (shown by the dashed lines in FIG. 23) in a position adjacent the feedback magnet 410 mounted to the mirror bracket 403. The motion of mirror 402 is driven by passing an oscillating drive current through drive coil 406. The drive coil 406 (shown by the dashed lines in FIG. 23) is attached to the underside of PCB 415, the actuator coil leads 407 of the drive coil 406 extending through the board 415. When the PCB 415 is installed, the drive coil 406 is positioned in the recess 405 adjacent the actuator magnet 404. Travel stops 416, 416 are positioned to restrict the amplitude of the dithering motion to a maximum dithering amplitude as previously described.

In operation, the laser diode module 452 generates a laser beam 460 which is focused by a collimating lens located within the module barrel, passed through the exit slot, and directed onto the dithering mirror 402. The laser diode module 452 is positioned adjacent the collection lens 470. The collection lens 470 has a cutout notch 473 on one side within which the diode module 452 is positioned thereby providing further compactness of structure and enabling the diode 452 to be located closer to being coaxial with the collection lens 470. The dithering mirror 402 oscillates to produce a scan line. Return signal reflected and/or refracted from a target returns to the dithering mirror 402 and is directed to collection mirror 470 which focuses the return beam which is reflected by the 450 fold mirror 472 up to the detector photodiode 419. The detector detects and converts the signal into electrical impulses corresponding to, in the case of reading a barcode symbol, the bars and spaces.

The system may comprise additional laser beam focusing features such as described in U.S. Pat. Nos. 5,565,668 and 5,641,958 herein incorporated by reference.

The dithering mirror 402 may be flat mirror as shown or alternately may be curved thereby providing focusing power. The mirror 402 may alternately include a small inset mirror attached to or molded with the mirror 402 for reflecting the outgoing beam 460.

Figure 27:
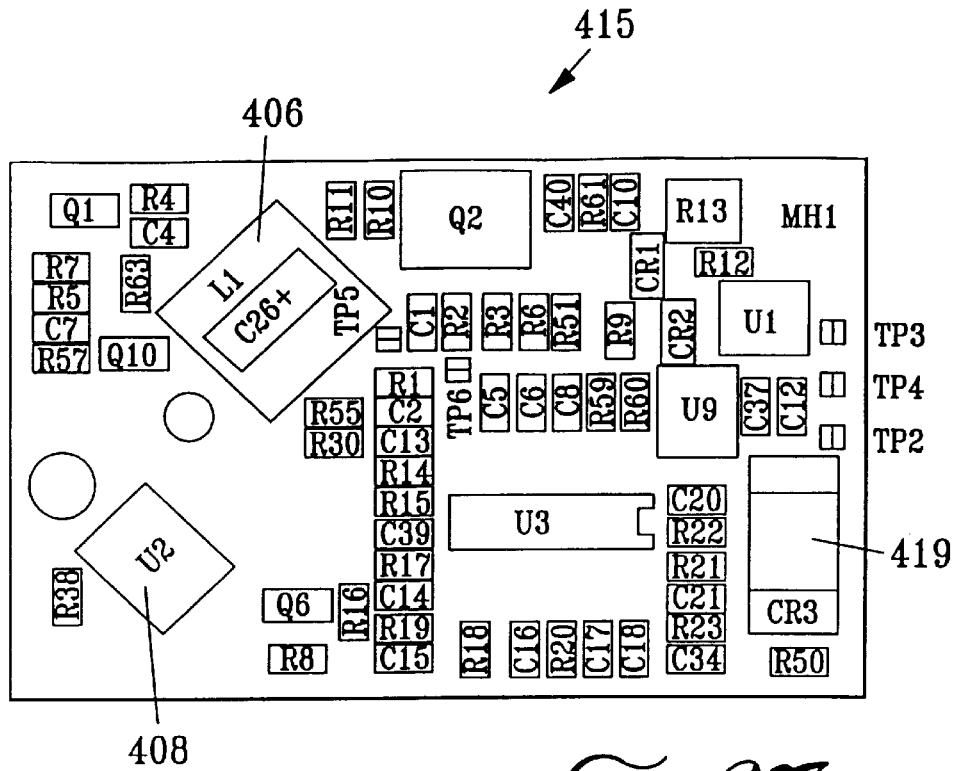
FIG. 27 is a bottom side assembly drawing of the printed circuit board of the scan module of FIG. 23.

The scanner PCB 415 is also configured to provide for compact construction. FIG. 27 is a bottom side assembly drawing of the printed circuit board 415 of the scan module 400 of FIG. 23. Several scanner components are efficiently mounted on the underside of PCB 415 including the detector 419, the actuator coil 406 and the Hall sensor 408. The only electronic component not mounted to the PCB 415 is the laser diode module 452. The leads 453 of the diode module 452 are connected to the connectors 456 on the PCB 415 by a ribbon cable (not shown). The ribbon cable exerts minimal forces on the diode module minimizing potential for misalignment.

Figure 29:
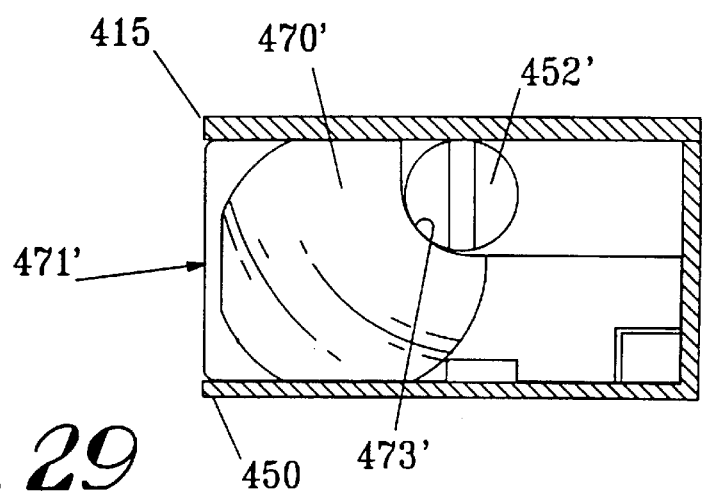
FIG. 29 is a cross sectional view of an alternate scan module configuration.
Figure 26:
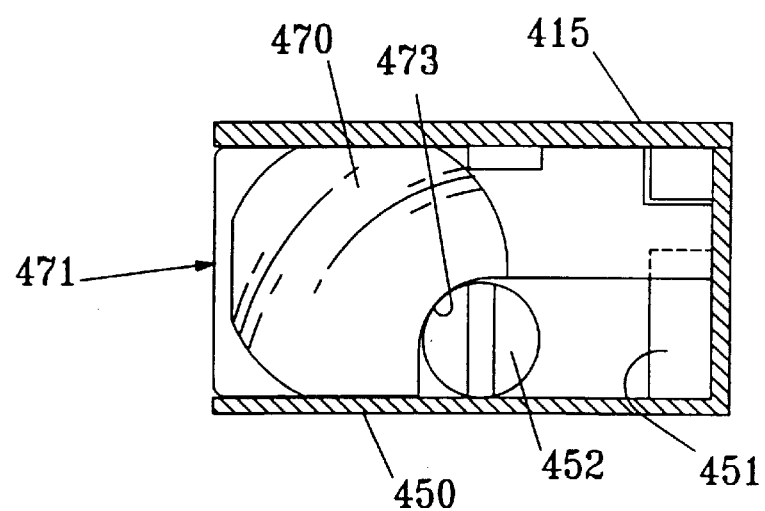
FIG. 26 is a cross sectional view of the scan module of FIG. 23 taken along line 26—26.

FIG. 29 illustrates an alternate embodiment similar to the cross section of FIG. 26 wherein the diode module 452' is mounted to the PCB 415 enabling all the electronic components of the scan module 400 to be compactly and efficiently assembled on a single printed circuit board. By locating the diode module 452' either on the PCB 415 or adjacent thereto, it may be possible to connect the leads (not shown) of the diode 452' directly to the PCB 415 eliminating the need for the ribbon cable of the previous configuration.

Figure 28:
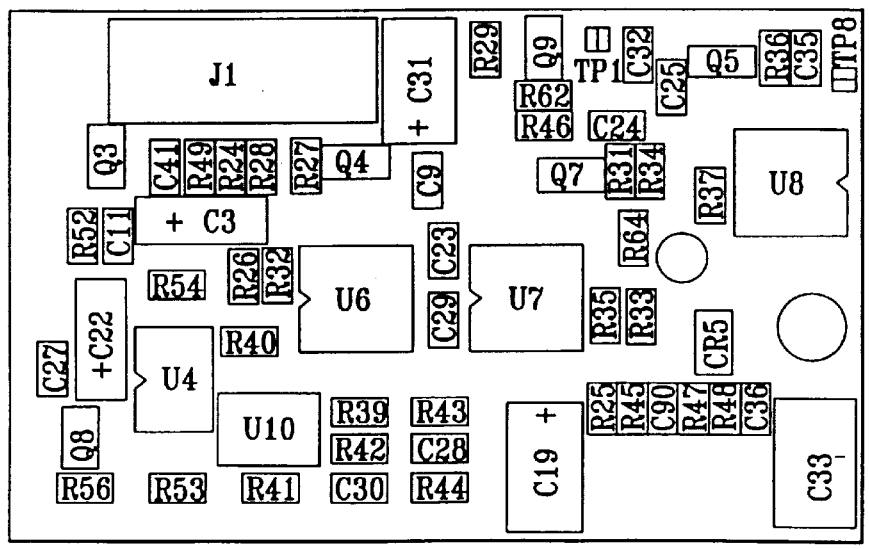
FIG. 28 is a top side assembly drawing of the printed circuit board of the scan module of FIG. 23.

FIG. 28 is an assembly drawing of the top side of the PCB 415 illustrating that the top side of the board contains additional electronic components. By mounting components on both sides of the board, the size of the printed circuit board may be minimized with all module electronics mounted on a single board.

Though the dithering assembly provides for a highly compact structure, the dithering assembly may further include additional drive mechanism(s) to produce multiple scan lines for creating a more complex scan pattern such as for example, an asterisk pattern. Such a complex pattern generation system is described in Rando et al. U.S. application Ser. No. 08/662,514 herein incorporated by reference. Depending upon the application, other scan mechanisms may be used in the module such as for example the other dithering mechanisms disclosed in in Rando et al. U.S. application Ser. No. 08/662,514, and rotating polygon mirrors or holographic elements, particularly for generating multiple scan lines.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A dithering assembly comprising
    a fixed member;
    a mirror assembly comprising a mirror bracket and a dithering mirror mounted on the mirror bracket, the mirror bracket being pivotally mounted to the fixed member to allow the mirror bracket to pivot about a center of rotation axis in at least two opposite directions;
    a electromagnetic drive assembly comprising at least a first drive magnet and at least a first electro-magnet, one of the first drive magnet and the first electro-magnet being fixedly mounted on the fixed member, wherein the first drive magnet is positioned proximate to the first electro-magnet, wherein the first drive magnet is driven by a magnetic field generated by the first electro-magnet as a flow of current is applied to the first electro-magnet;
    position sensing mechanism including
        a feedback magnet mounted on a side of the mirror bracket opposite to the first drive magnet,
        a Hall sensor mounted in a fixed position adjacent the feedback magnet for sensing position of the mirror assembly.

2. A dithering assembly according to claim 1 wherein the Hall sensor comprises an integrated circuit including an amplifier.

3. A dithering assembly according to claim 1 wherein the feedback magnet is positioned having a magnetic axis oriented horizontally relative to the Hall sensor with motion of the feedback magnet being parallel to its magnetic axis.

4. A dithering assembly according to claim 1 further comprising a printed circuit board, wherein the first electro-magnet comprises a drive coil and wherein the Hall sensor and the drive coil are mounted on the printed circuit board.

5. A dithering assembly according to claim 1 incorporated into a scan module, the scan module comprising a housing, a beam source generating a reading beam and directing the reading beam onto the dithering mirror, a collection lens for focusing return signal from an object being scanned, a detector for detecting and converting the return signal into an electrical signal, and a printed circuit board disposed on one side of the housing, wherein the Hall sensor, the detector and the first electro-magnet are mounted on the printed circuit board.

6. A dithering assembly according to claim 5 wherein the printed circuit board includes a controller for receiving the signal from the Hall sensor and controlling the flow of current applied to the first electro-magnet.

7. A compact scan module comprising a fixed member;

a mirror assembly comprising a mirror bracket and a dithering mirror mounted on the mirror bracket, the mirror bracket being pivotally mounted to the fixed member allow the mirror bracket to pivot about a pivoting axis in at least two opposite directions;

at least a first drive magnet mounted on the mirror bracket on one side of the pivoting axis;

a first electromagnet mounted in a fixed position proximate the first drive magnet, wherein the first drive magnet is respectively attracted or repelled to the respective first electromagnet as a flow of current is applied to the first electromagnet in a controlled manner;

a feedback magnet mounted on a side of the mirror bracket opposite to the first drive magnet;

a position sensor mounted in a fixed position adjacent the feedback magnet for sensing position of the mirror assembly;

a printed circuit board disposed on one side of the scan module, wherein the detector, the first electromagnet and the position sensor are mounted on the printed circuit board.

8. A compact scan module according to claim 7 wherein all electronic components of the scan module are mounted on the printed circuit board.

9. A compact scan module according to claim 7 wherein the position sensor comprises a Hall sensor.

10. A compact scan module according to claim 7 wherein the position sensor comprises a feedback coil.

* * * * *